US012687270B2

(12) United States Patent
Bhutani et al.

(10) Patent No.: US 12,687,270 B2
(45) Date of Patent: Jul. 21, 2026

(54) MODULAR CUTOFF SHIELD FOR HEADLIGHTS

(71) Applicant: Autosystems, a division of Magna Exteriors Inc, Aurora (CA)

(72) Inventors: Gaurav Bhutani, Whitby (CA); Patrick J. Stuart, Harrowsmith (CA); Richard Rupke, Colborne (CA)

(73) Assignee: Autosystems, a division of Magna Exteriors Inc., Aurora (CA)

(*) Notice: Subject to any disclaimer, the term of this patent is extended or adjusted under 35 U.S.C. 154(b) by 0 days.

(21) Appl. No.: 18/903,702

(22) Filed: Oct. 1, 2024

(65) Prior Publication Data

US 2025/0207749 A1 Jun. 26, 2025

Related U.S. Application Data

(60) Provisional application No. 63/613,834, filed on Dec. 22, 2023.

(51) Int. Cl.

| | |
|---|---|
| ***F21S 41/43*** | (2018.01) |
| ***F21S 41/143*** | (2018.01) |
| ***F21S 41/151*** | (2018.01) |
| ***F21S 41/47*** | (2018.01) |

(52) U.S. Cl.

CPC ............ *F21S 41/43* (2018.01); *F21S 41/143* (2018.01); *F21S 41/151* (2018.01); *F21S 41/47* (2018.01)

(58) Field of Classification Search

CPC ........ F21S 41/143; F21S 41/151; F21S 41/25; F21S 41/40; F21S 41/43; F21S 41/47; F21W 2102/13; F21W 2102/135; F21W 2102/14; F21W 2102/145; F21W 2102/15; F21W 2102/155; F21W 2102/16; F21W 2102/165; F21V 17/06; F21V 17/08; F21V 17/10; F21V 17/16; F21V 17/162; F21V 17/164; F21V 19/003; F21V 19/0035; F21V 15/01; F21V 15/012

See application file for complete search history.

(56) References Cited

U.S. PATENT DOCUMENTS

2005/0122734 A1* 6/2005 Foust ...................... B60Q 1/18 362/539

2005/0225999 A1* 10/2005 Bucher ..................... F21V 7/28 362/539

2006/0114677 A1* 6/2006 Delourme ............... F21S 41/43 362/306

(Continued)

FOREIGN PATENT DOCUMENTS

CN 114963115 A * 8/2022

EP 1111299 A1 * 6/2001 ............ F21S 48/142

(Continued)

*Primary Examiner* — Erin Kryukova

(74) *Attorney, Agent, or Firm* — DICKINSON WRIGHT PLLC

(57) ABSTRACT

A lighting module for a headlight in a vehicle includes: a light source; a lens; and a housing. The housing holds the light source. The housing also holds the lens at a fixed position relative to the light source and spaced apart therefrom. The housing includes an outer surface that defines a slot. A cutoff shield extends through the slot and into an interior of the housing between the light source and the lens for blocking a portion of light emitted from the light source.

17 Claims, 8 Drawing Sheets

(56) References Cited

U.S. PATENT DOCUMENTS

| | | | | |
|---|---|---|---|---|
| 2009/0185382 | A1* | 7/2009 | Chiang | F21S 41/43<br>362/310 |
| 2010/0124069 | A1* | 5/2010 | Nomura | F21S 41/43<br>362/512 |
| 2017/0129393 | A1* | 5/2017 | Johnson | F21S 41/43 |
| 2018/0066823 | A1* | 3/2018 | Chou | F21S 41/255 |
| 2019/0056082 | A1* | 2/2019 | Abe | F21S 41/47 |

FOREIGN PATENT DOCUMENTS

| | | | | |
|---|---|---|---|---|
| EP | 2338728 | A1 * | 6/2011 | B60Q 1/076 |
| EP | 2660506 | A2 * | 11/2013 | F21S 41/172 |

* cited by examiner

MODULAR CUTOFF SHIELD FOR HEADLIGHTS

CROSS REFERENCE TO RELATED APPLICATIONS

This U.S. utility patent application claims the benefit of U.S. Provisional Patent Application No. 63/613,834, filed Dec. 22, 2023, the contents of which is incorporated herein by reference in its entirety.

FIELD

The present disclosure relates generally to lighting for motor vehicles. More specifically, the present disclosure relates to headlights for passenger vehicles, such as cars and trucks.

BACKGROUND

Headlight assemblies for vehicles are subject to regulations regarding a cut-off pattern in order to illuminate a roadway ahead of the vehicle while also minimizing disruption to drivers of other vehicles, including oncoming traffic and vehicles traveling ahead of and in a same direction as the subject vehicle. Several different regulations and standards for headlight illumination may apply in different jurisdictions. Examples of such regulations and standards include ECE Created by the United Nations Economic Commission for Europe, United States Department of Transportation (DOT) for use in the U.S. & Canada, CCC certification for China, and U.S. Society of Automotive Engineers (SAE) standards.

Headlight Assemblies may include one or more lighting modules each configured to provide a specific illumination pattern. There is a demand for lighting modules with ever smaller sizes and in various different layout configurations to provide stylish arrangements that also meet regulatory and manufacturer requirements for light output.

SUMMARY

The present disclosure provides a lighting module for a headlight in a vehicle. The lighting module includes: a light source, a lens, and a housing. The housing holds the light source. The housing also holds the lens at a fixed position relative to the light source and spaced apart therefrom. The housing includes an outer surface that defines a slot. A cutoff shield extends through the slot and into an interior of the housing between the light source and the lens for blocking a portion of light emitted from the light source.

The present disclosure also provides a headlight assembly for a vehicle. The headlight assembly includes an enclosure; a bezel inside the enclosure and defining an opening, and at least one lighting module disposed inside the enclosure. The at least one lighting module includes: a light source, a lens that protrudes through the opening in the bezel, a housing, and a cutoff shield. The housing holds the light source. The housing also holds the lens at a fixed position relative to the light source and spaced apart therefrom. The housing includes an outer surface that defines a slot. The cutoff shield extends through the slot and into an interior of the housing between the light source and the lens for blocking a portion of light emitted from the light source.

These and other aspects of the present disclosure are disclosed in the following detailed description of the embodiments, the appended claims, and the accompanying figures.

BRIEF DESCRIPTION OF THE DRAWINGS

Further details, features and advantages of designs of the invention result from the following description of embodiment examples in reference to the associated drawings.

DETAILED DESCRIPTION

Figure 1:
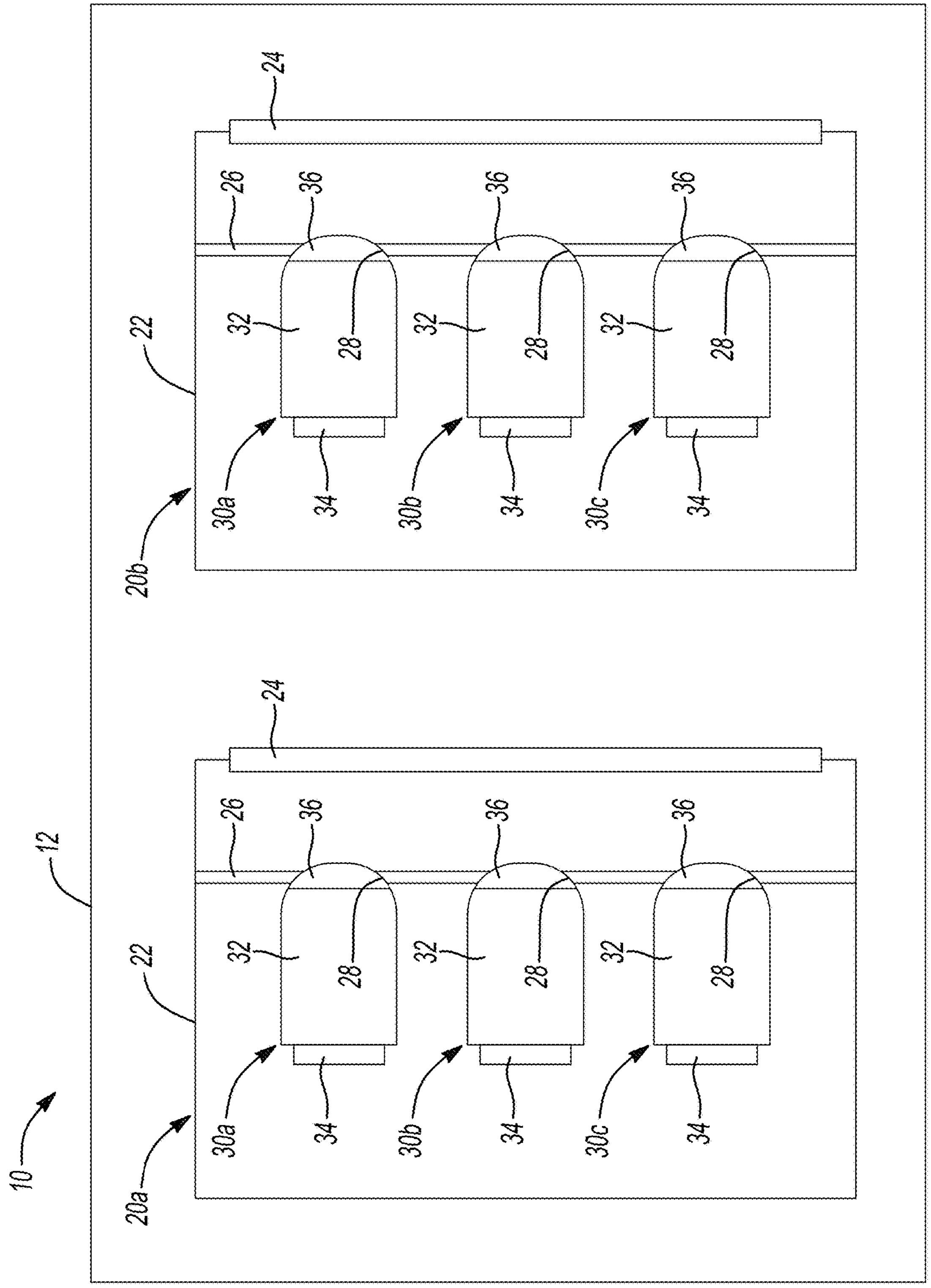
FIG. 1 shows a schematic block diagram of a vehicle with two headlight assemblies, in accordance with the present disclosure.

Referring to the drawings, the present invention will be described in detail in view of following embodiments.

FIG. 1 shows a schematic block diagram of a vehicle 10 with a lighting system 12, according to an aspect of the present disclosure. The vehicle 10 may be a motor vehicle, such as a passenger car or truck. However, the headlamp assembly of the present disclosure may be applicable to other types of vehicles, such as commercial trucks, busses, trains, etc. The vehicle 10 with the lighting system 12 of the present disclosure may also be referred to as the ego vehicle or the subject vehicle. The lighting system 12 includes a left-side headlight assembly 20*a* and a right-side headlight assembly 20*b*. Each of the headlight assemblies 20*a*, 20*b* may be similar or identical to one-another. In some embodiments, the headlight assemblies 20*a*, 20*b* may include similar or identical internal components and different external components, such as an enclosure 22 that is configured to fit within the structure on the corresponding side of the vehicle 10.

As shown in FIG. 1, each of the headlight assemblies 20*a*, 20*b* also includes a window 24 of transparent material for emitting light and a bezel 26 disposed within a corresponding one of the enclosures 22. Each of the bezels 26 defines a plurality of openings 28.

Each of the each of the headlight assemblies 20*a*, 20*b* also includes three lighting modules 30*a*, 30*b*, 30*c*. The three lighting modules 30*a*, 30*b*, 30*c* include a first lighting module 30*a*, a second lighting module 30*b*, and a third lighting module 30*c*, and which each provide a corresponding beam pattern. The first lighting module 30*a*, which may be called a LB spot module, provides a low-beam spot beam pattern with relatively high intensity over a relatively small angular field of illumination. The second lighting module 30*b*, which may be called a LB spread module, provides a low-beam spread beam pattern with relatively lower intensity and over a relatively large angular field of illumination. The third lighting module 30*c*, which may be called a high beam module, provides high intensity illumination over another field of illumination, which may extend above the low-beam fields of illumination. However, the principles of the present disclosure may be applied to other headlight assemblies that include fewer than or more than three lighting modules and/or lighting modules having different purposes or arrangements.

In some embodiments, and as described in the present disclosure, each of the three lighting modules 30*a*, 30*b*, 30*c* includes a light source 34 configured to produce light. The light source 34 may include one or more light emitting diodes (LEDs) disposed on a substrate, such as a printed circuit board. However, the light source 34 may include other types of illumination sources, such as LED arrays, organic LEDs (OLEDs) halogen bulbs, high-intensity discharge (HID) lamps, lasers, etc.

Each of the three lighting modules 30*a*, 30*b*, 30*c* also includes a secondary lens 36, for focusing and directing light emitted by the corresponding light source 34. The secondary lens 36 may be made of Poly(methyl methacrylate) (PMMA). However, the secondary lens 36 may include one or more other materials. In some embodiments, and as shown in FIG. 1, the secondary lenses 36 may each protrude through a corresponding one of the openings 28 in the bezel 26. Each of the three lighting modules 30*a*, 30*b*, 30*c* also includes a housing 32. The housings 32 may be made of a high-temperature polycarbonate (PC-HT) material. However, the housings may include one or more other materials. The housings 32 each hold the corresponding light source 34 and the corresponding secondary lens 36, with the secondary lens 36 at a fixed position relative to the light source 34 and spaced apart therefrom.

Figure 2:
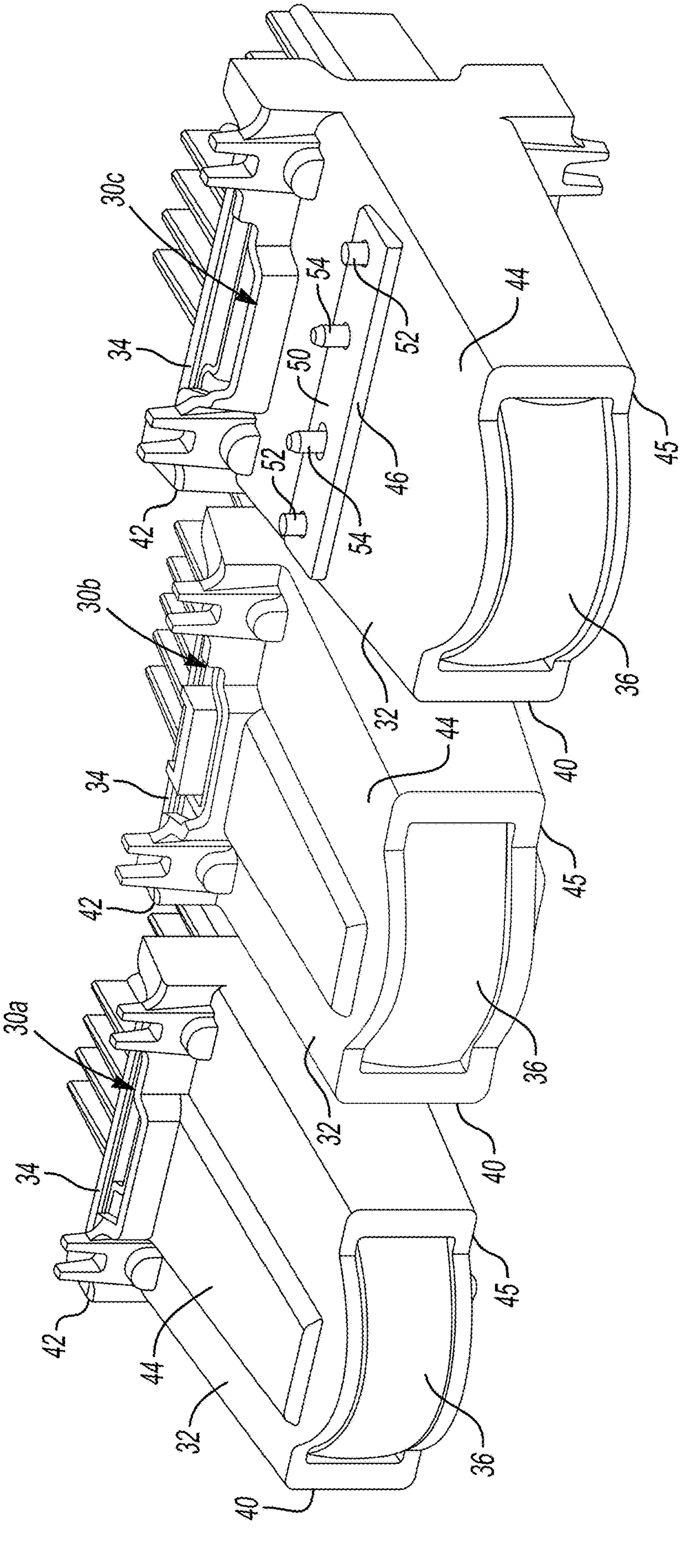
FIG. 2 shows a perspective view of three lighting modules as arranged in a headlight assembly, in accordance with the present disclosure.

FIG. 2 shows a perspective view of the three lighting modules 30*a*, 30*b*, 30*c* with an in-line arrangement, as they may be arranged in a headlight assembly 20*a*, 20*b*. However, the lighting modules 30*a*, 30*b*, 30*c* may be arranged in a vertical-stacked configuration or in any other arrangement. Each of the three lighting modules 30*a*, 30*b*, 30*c* have secondary lenses 36 that are generally rectangular, as viewed head-on. The secondary lenses 36 may have a relatively thin profile. For example, in some embodiments, the secondary lenses 36 may each have a height of about 15 mm and a width of about 45 mm. Lighting modules with such small dimensions may present challenges for packaging and assembly, which may be especially difficult with the inclusion of cutoff shields and associated structures for locating and attaching the cutoff shields 50 to the housings 32.

As also shown in FIG. 2, each of the housings 32 include several outer surfaces 44, 45 including an upper surface 44 and a lower surface 45. The upper surface 44 of the third lighting module 30*c* defining a slot 46 and with a cutoff shield 50 extending through the slot 46 and into an interior of the housing 32 between the light source 34 and the secondary lens 36 for blocking a portion of light emitted from the light source 34. The cutoff shield 50 may, therefore, function to define high-contrast edge of the high-beam pattern. In some embodiments, the lower surfaces 45 of the first lighting module 30*a* and the second lighting module 30*b* each also include slots 46 for receiving corresponding cutoff shields 50.

The cutoff shields 50 of the present disclosure, which are mounted on an exterior of the housing 32, provide several advantages over alternative designs. The combination of the slots 46 receiving the cutoff shields 50 allows lighting modules 30*a*, 30*b*, 30*c* to be manufactured easily and without any fasteners or other structures in the interior of the housings 32, which could otherwise interfere with installation of the secondary lenses 36 and which could otherwise block a portion of light passing therethrough. The combination of the slots 46 receiving the cutoff shields 50 allows lighting modules 30*a*, 30*b*, 30*c* to be relatively easily manufactured with thin profile sizes to meet manufacturer requirements.

The secondary lenses 36 may function to invert the illumination patterns from each of the three lighting modules 30*a*, 30*b*, 30*c*. The first lighting module 30*a* and the second lighting module 30*b* are each configured to produce low-beam lighting patterns of illumination below corresponding cutoff lines, and the third lighting module 30*c* is configured to produce a high-beam lighting pattern of illumination above a corresponding cutoff line. Because of the inverting function of the secondary lenses 36, the cutoff shield 50 of the first lighting module 30*a* and the second lighting module 30*b* may each be installed through the respective lower surfaces 45 and extend upwardly into the interior of the corresponding one of the housings 32 in order to produce the corresponding low-beam lighting patterns with patterns of illumination below corresponding cutoff lines. However, the cutoff shield 50 of the third lighting module 30*c* may be installed through the upper surface 44 and extend downwardly into the interior of the housing 32 in order to produce the high-beam lighting pattern of illumination above the corresponding cutoff line.

Each of the housings 32 have a tubular shape with a generally rectangular cross-section and which extends between a first end 40 and a second end 42. The secondary lenses 36 are each disposed within a corresponding one of the housings 32 and adjacent to the first end 40. The light sources 34 are attached to each of the housings 32 and adjacent to the second end 42. In some embodiments, and as shown on FIG. 2, the housings 32 include a mounting flange at the second end 42 for mounting the housing 32 within the corresponding headlight assembly 20*a*, 20*b*.

In some embodiments, the tubular shape of each of the housings 32 defines an interior having a substantially constant cross-section substantially an entire length between the first end 40 and the second end 42. Alternatively or additionally, the tubular shapes of one or more of the housings 32 may define a taper with a progressive narrowing in width and/or height from the second end 42 toward the first end. This substantially constant cross-section or tapering may allow the secondary lenses 36 to be slid into position through an opening at the second end 42 and for securement within the housing 32 adjacent to the first end 40.

In some cases, such as the third lighting module 30*c* shown in FIG. 2, the upper surface 44 and the lower surface 45 are each flat. In other cases, either or both of the upper surface 44 and/or the lower surface 45 may be non-flat. For example, the first lighting module 30*a* and the second lighting module 30*b* shown in FIG. 2 each include upper surfaces 44 with a ridge protruding therefrom along a length between the first end 40 and the second end 42. However, the upper surface 44 and/or the lower surface 45 may have a different flat or non-flat shape, such as one or more simple or complex curves or a different taper.

In some embodiments, the cutoff shield 50 is attached to the outer surface 44, 45 of the housing 32, without any fastener in the interior of the housing 32 for holding the cutoff shield 50. For example, the outer surface 44, 45 of the housing 32 may define one or more fixation features adjacent to the slot 46 and which are deformed to secure the cutoff shield 50 thereto. FIG. 2 shows the housing 32 of the third lighting module 30*c* with fixation features as two fixation pins 52 defined in the upper surface 44 of the housing 32 adjacent to the slot 46. Each of the two fixation pins 52 extends through a corresponding hole in the cutoff shield 50 and is configured to be melted or otherwise deformed to secure the cutoff shield 50 to the upper surface 44 of the housing 32. The fixation pins 52 may be integrally formed with the housing, for example, as a single molded article. One or more of the fixation features may include other structures, such as clips, tabs, catches, or fasteners that may be partially or entirely formed by the housing.

In some embodiments, the outer surface 44, 45 of the housing 32 defines an alignment feature adjacent to the slot 46 and which engages a corresponding structure of the cutoff shield 50 for aligning the cutoff shield 50 at a particular position relative to the secondary lens 36 and the light source 34. For example, FIG. 2 shows the housing 32 of the third lighting module 30*c* with alignment features as two alignment pins 54 defined in the upper surface 44 of the housing 32 adjacent to the slot 46. Each of the two alignment pins 54 extend through corresponding holes in the cutoff shield 50 for aligning the cutoff shield 50 at a particular position relative to the secondary lens 36 and the light source 34. The alignment pins 54 may be integrally formed with the housing, for example, as a single molded article. One or more of the alignment features may include other structures, such as tabs, slots, indentations, or holes, and which may be partially or entirely formed by the housing.

Figures 3A, 3B, 3C, 3D:
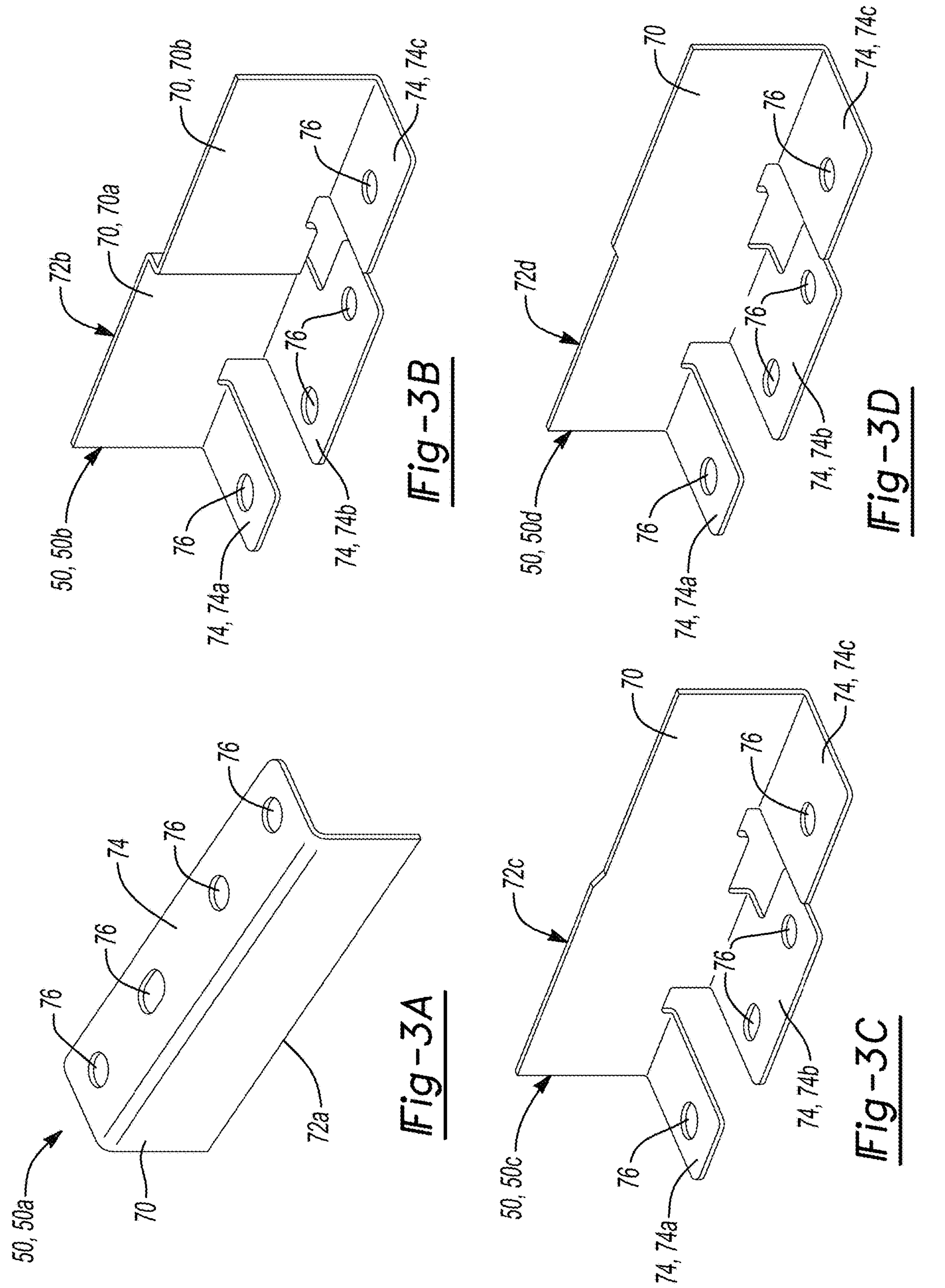
FIGS. 3A-3D show four different cutoff shields for use in a given one of the lighting modules to produce different cutoff patterns, in accordance with the present disclosure.

FIGS. 3A-3D each show a different one of the cutoff shields 50*a*, 50*b*, 50*c*, 50*d* that may each be used as the cutoff shield 50 in a given one of the lighting modules 30*a*, 30*b*, 30*c*, 30*d* to produce different cutoff patterns. FIG. 3A shows a first cutoff shield 50*a*, which may also be called a high-beam cutoff shield, and which defines a first terminal edge 72*a* configured to produce a cutoff pattern as a flat horizontal line. FIG. 3B shows a second cutoff shield 50*b*, which may also be called an SAE cutoff shield, and which defines a second terminal edge 72*b* configured to produce a cutoff pattern in accordance with Society of Automotive Engineers (SAE) standards for North America. FIG. 3C shows a third cutoff shield 50*c*, which may also be called an ECE-LHD cutoff shield, and which defines a third terminal edge 72*c* configured to produce a cutoff pattern in accordance with United Nations Economic Commission for Europe (ECE) standards for Europe and with a left-hand drive (LHD) configuration. FIG. 3D shows a fourth cutoff shield 50*d*, which may also be called an ECE-RHD cutoff shield, and which defines a fourth terminal edge 72*d* configured to produce a cutoff pattern in accordance with ECE standards with a right-hand drive (LHD) configuration.

The different configurations for the cutoff shield 50 may allow for a common design for one or more of the three lighting modules 30*a*, 30*b*, 30*c*, and with shared components and which can be tailored for different regions with minimal costs for modification and retooling, thus providing several opportunities for cost savings over alternative designs that are region-specific. The different configurations for the cutoff shields 50 of the present disclosure may also provide enhanced ability to modify the cutoff pattern for future regulatory and/or manufacturer requirements, by changing only the cutoff shield 50, and without having to change other components of the lighting modules 30*a*, 30*b*, 30*c*, providing additional flexibility and opportunities for cost savings.

Some or all of the different cutoff shields 50 may be made from a flat sheet of material, such as sheet metal, with one or more bends to define an L-shaped cross-section along part or all of a width thereof. The cutoff shields 50 may be made of, for example, stainless steel. However, the cutoff shields 50 may include other materials. In some embodiments, and as shown in FIGS. 3A-3D, the cutoff shield 50 includes a shield portion 70 and a base portion 74 at a right-angle thereto. Each of the shield portions 70 defines a corresponding one of the terminal edges 72*a*, 72*b*, 72*c*, 72*d* opposite from the base portion 74 and is configured to extend through the slot 46 and into an interior of the housing 32 between the light source 34 and the secondary lens 36 for blocking a portion of light emitted from the light source 34. In some embodiments, and as shown in FIGS. 3A-3D, the base portions 74 each define a plurality of holes 76 for receiving corresponding ones of the fixation pins 52 and/or the alignment pins 54.

In some embodiments, the shield portion 70 includes two or more panels 70*a*, 70*b* extending parallel to and spaced apart from one another. For example, the second cutoff shield 50*b* includes a first panel 70*a* and a second panel 70*b* parallel to and spaced apart therefrom to cause the two panels 70*a*, 70*b* to be at different distances from the light source 34*a*. The two panels 70*a*, 70*b*, together, define the second terminal edge 72*b*.

In some embodiments, and where the outer surface 44, 45 of the housing 32 is non-flat, the base portion 74 may include two or more different sections 74*a*, 74*b*, 74*c* at different heights in a direction transverse to the shield portion to engage corresponding parts of the outer surface 44, 45 for securement thereto. For example, the cutoff shields 50 shown in each of FIGS. 3B-3D each include base portions 74 having three different sections 74*a*, 74*b*, 74*c* each configured engage a lower surface 45 with a ridge, as best shown on FIG. 5.

Figure 4:
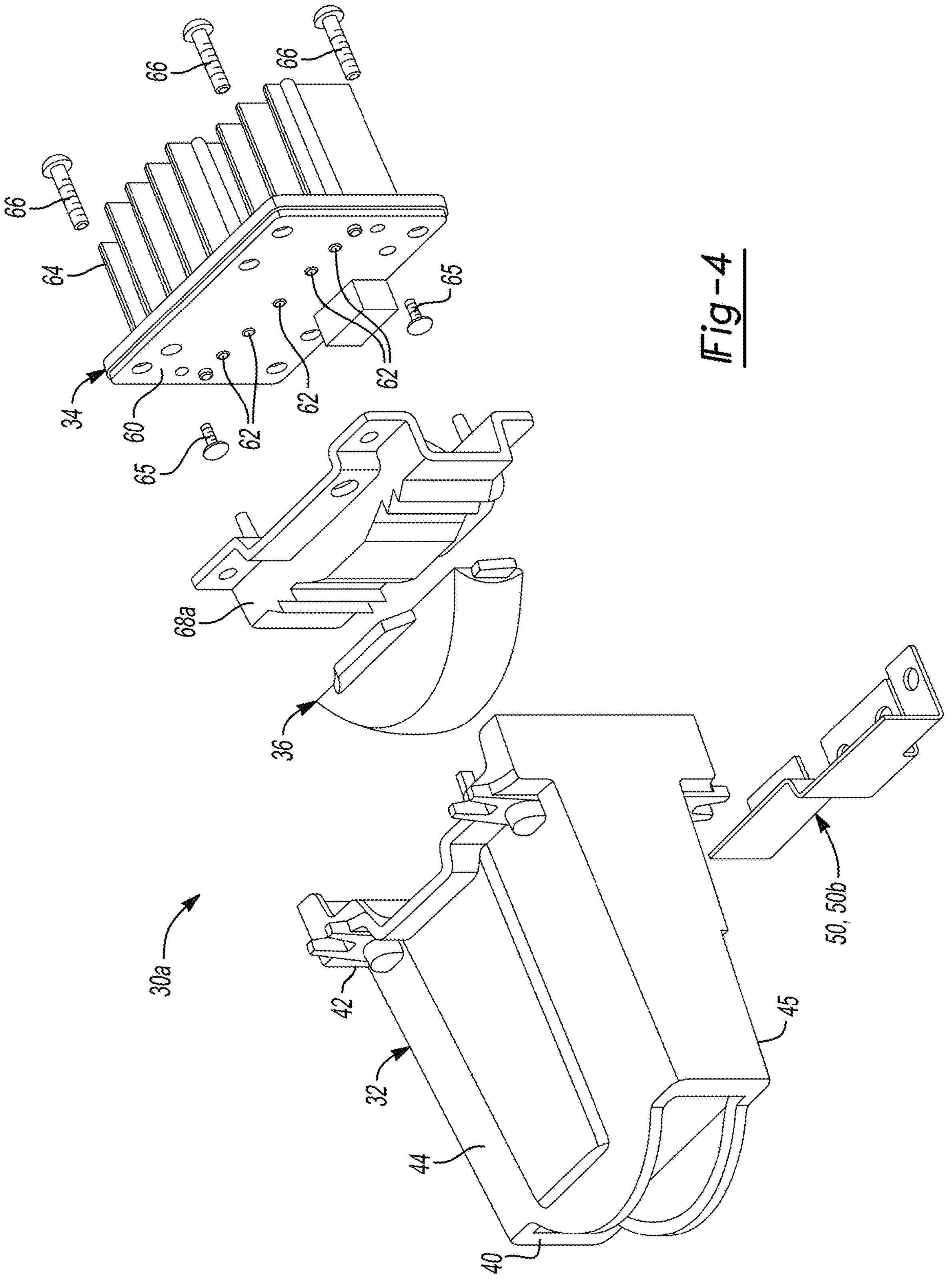
FIG. 4 shows an exploded view of a first lighting module of the three lighting modules, in accordance with present disclosure.
Figure 5:
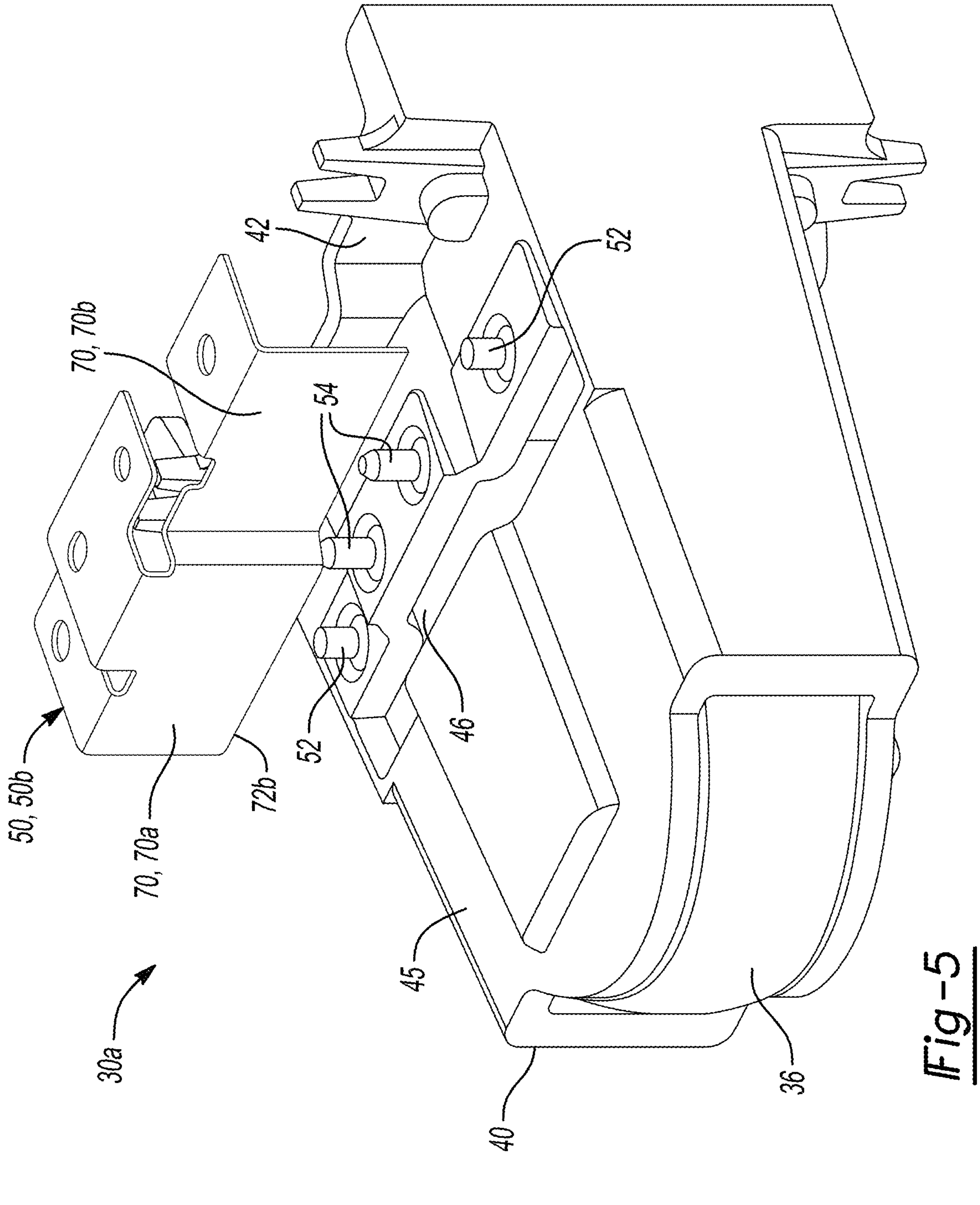
FIG. 5 shows a perspective view of the first lighting module of FIG. 4, in an inverted orientation to show a lower surface thereof, in accordance with the present disclosure.

FIGS. 4-5 each show exploded views of the first lighting module 30*a*. As shown, the first lighting module 30*a* includes the housing 32 with the light source 34 the secondary lens 36 each configured to be attached thereto. As shown, the light source 34 includes a substrate 60, such as a printed circuit board (PCB) with five LEDs 62 disposed thereupon in a horizontal line. A heat sink 64 is attached to a rear surface of the substrate 60, opposite from the LEDs 62. A set of first screws 65 extends through the substrate 60 for securing the heat sink 64 thereto. A first primary lens 68*a* is disposed over the LEDs 62, between the LEDs 62 and the secondary lens 36. The first primary lens 68*a* may be made of Polymethacrylmethylimide (PMMI). However, the first primary lens 68*a* may include one or more other materials. A set of four second screws 66 extends through the heat sink 64 and the substrate 60 for securing the light source to the second end 42 of the housing 32.

Figure 6:
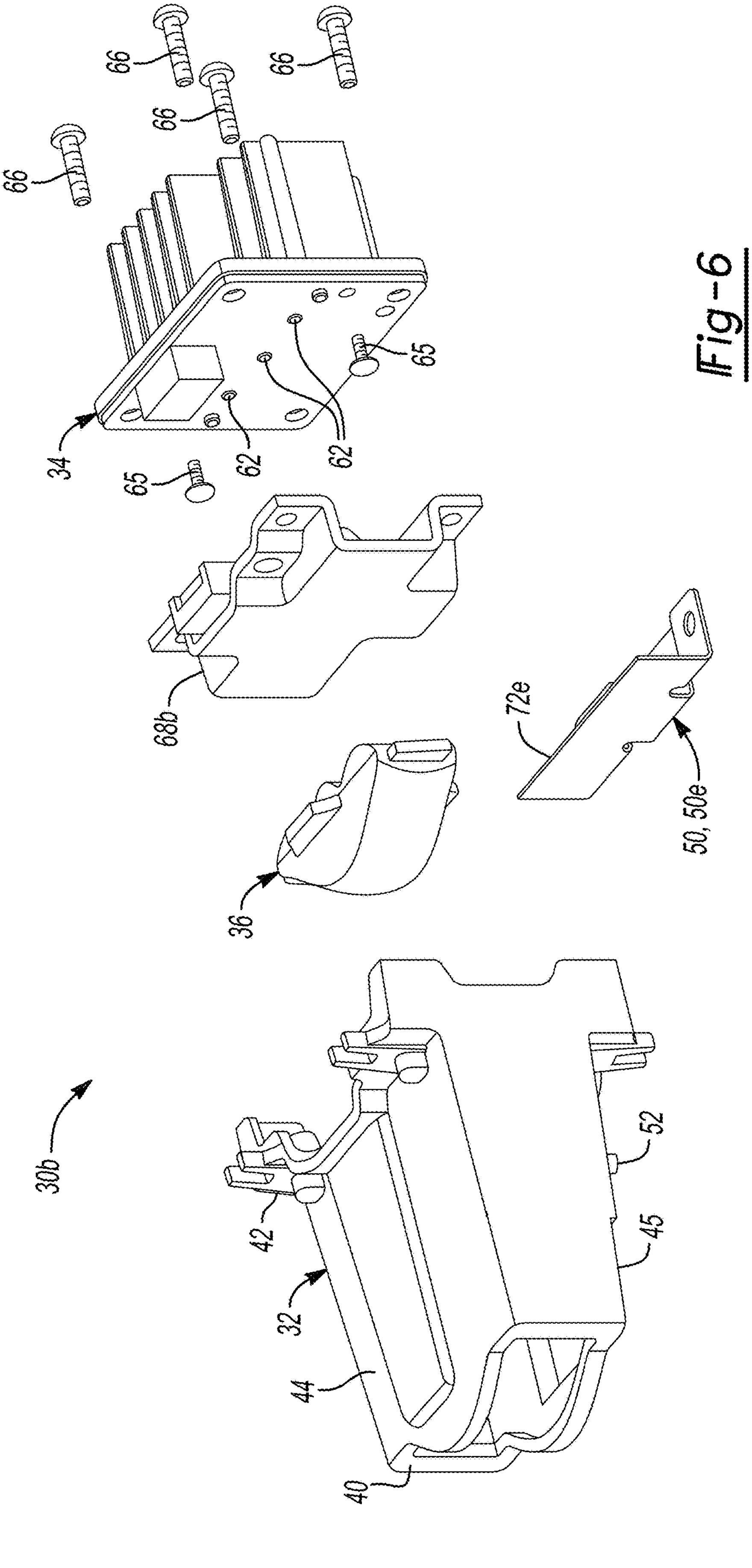
FIG. 6 shows an exploded view of a second lighting module of the three lighting modules, in accordance with present disclosure.

FIG. 6 shows an exploded view of the second lighting module 30*b*, which is similar to the first lighting module 30*a* shown in FIGS. 4-5 except with only three LEDs 62 and with a second primary lens 68*b* in place of the first primary lens 68*a*. The second primary lens 68*b* may be similar or identical to the first primary lens 68*a* except configured to project light from the three LEDs 62 and to provide the spread-beam pattern over a larger angular field of illumination. The second lighting module 30*b* also includes a fifth cutoff shield 50*e*, which defines a fifth terminal edge 72*e* configured to produce a corresponding cutoff pattern as a flat horizontal line and to cause the spread-beam illumination pattern to have a field of illumination that extends up to a corresponding cutoff line.

Figure 7:
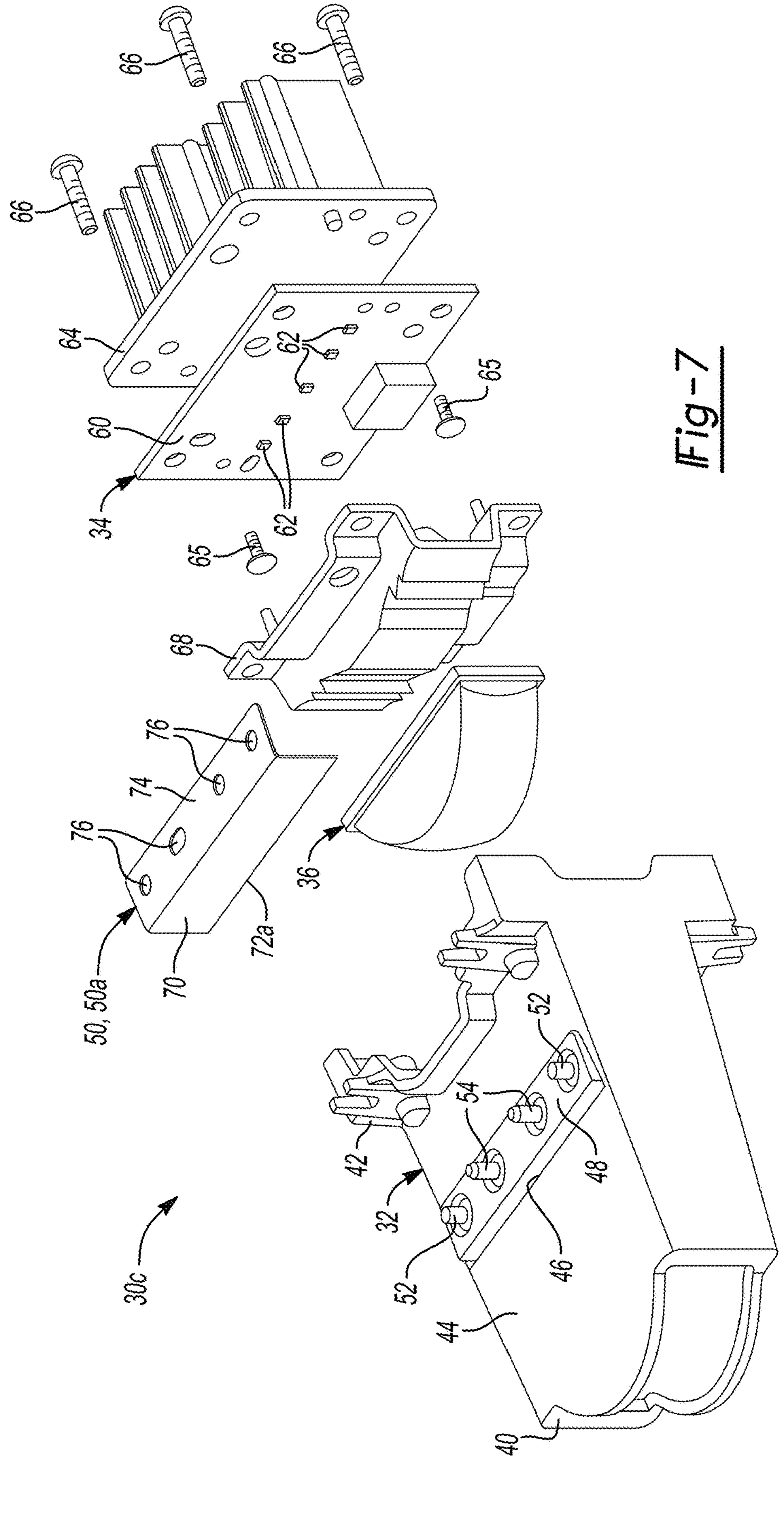
FIG. 7 shows an exploded view of a third lighting module of the three lighting modules, in accordance with present disclosure.
Figure 8:
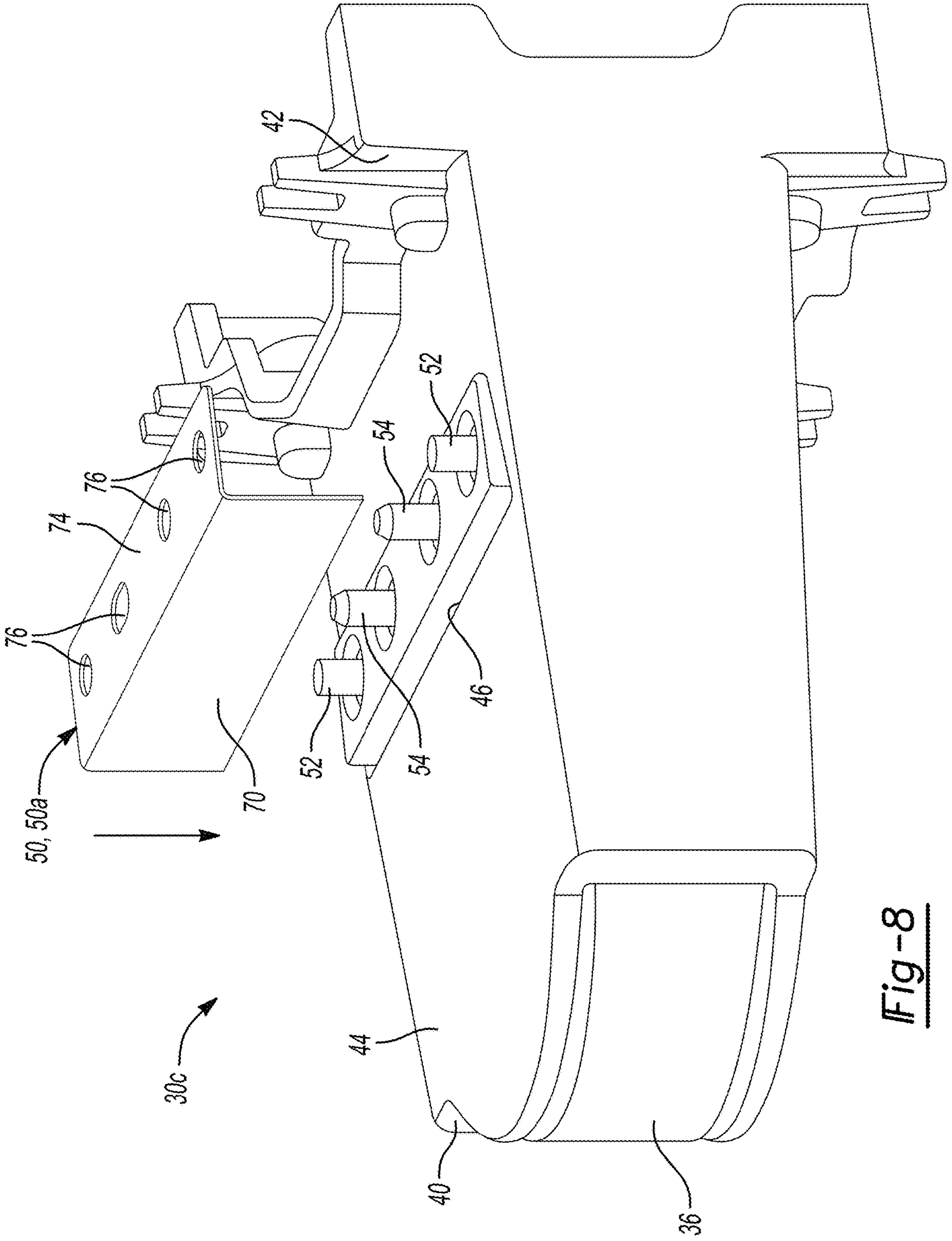
FIG. 8 shows a perspective view of the third lighting module of FIG. 7, and in accordance with the present disclosure.

FIGS. 7-8 each show different views of the third lighting module 30*c*. FIG. 7 shows the upper surface 44 defining a step 48 adjacent to the slot 46. The step 48 provides a flat surface that is parallel to a center axis of the housing 32 for engaging and locating the base portion 74 of the cutoff shield 50. The fixation pins 52 and the alignment pins 54 each protrude from the step 48 and transverse thereto.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lighting module for a headlight in a vehicle, comprising:

a light source;

a lens;

a housing holding the light source and holding the lens at a fixed position relative to the light source and spaced apart therefrom, wherein the housing includes an outer surface that defines a slot; and a cutoff shield extending from outside the housing through the slot and into an interior of the housing between the light source and the lens for blocking a portion of light emitted from the light source, wherein the cutoff shield is selected from a set of interchangeable cutoff shields, each having a different shape to define a different cutoff pattern and each sized and configured to extend through the slot.

2. The lighting module of claim 1, wherein the cutoff shield is fixed to the outer surface of the housing.

3. The lighting module of claim 2, wherein the outer surface of the housing defines an alignment feature adjacent to the slot and which engages a corresponding structure of the cutoff shield for aligning the cutoff shield at a particular position relative to the lens and the light source.

4. The lighting module of claim 1, wherein the outer surface of the housing defines a fixation feature adjacent to the slot and which is deformed by melting to secure the cutoff shield thereto, and wherein the fixation feature includes two pins that each extend through corresponding holes in the cutoff shield.

5. The lighting module of claim 1, wherein the outer surface is an upper surface configured to face upwardly with the lighting module in an installed orientation in the vehicle.

6. The lighting module of claim 1, wherein the outer surface is a lower surface configured to face downwardly with the lighting module in an installed orientation in the vehicle.

7. The lighting module of claim 1, wherein the cutoff shield comprises a flat sheet with a bend to define an L-shaped cross-section along a width thereof.

8. The lighting module of claim 1, wherein the cutoff shield is attached to the outer surface of the housing, without any fastener in the interior of the housing for holding the cutoff shield.

9. The lighting module of claim 1, wherein the outer surface is non-flat, wherein the cutoff shield includes a shield portion that extends through the slot, and a base portion for securement to the outer surface of the housing, and wherein the base portion defines two or more different sections, with each of the two or more different sections configured engage corresponding parts of the outer surface for securement thereto.

10. The lighting module of claim 9, wherein the two or more different sections have different heights in a direction transverse to the shield portion.

11. The lighting module of claim 9, wherein the cutoff shield includes a shield portion that extends through the slot, and wherein the shield portion includes two panels extending parallel to and spaced apart from one another.

12. A headlight assembly for a vehicle, comprising:

an enclosure;

a bezel inside the enclosure and defining an opening; and at least one lighting module disposed inside the enclosure and including:

a light source;

a lens that protrudes through the opening in the bezel;

a housing holding the light source and holding the lens at a fixed position relative to the light source and spaced apart therefrom, wherein the housing includes an outer surface that defines a slot; and a cutoff shield extending through the slot and into an interior of the housing between the light source and the lens for blocking a portion of light emitted from the light source, wherein the cutoff shield comprises a flat sheet with a bend to define an L-shaped cross-section along a width thereof, wherein the cutoff shield includes a shield portion and a base portion at a right-angle to the shield portion, wherein the shield portion defines a terminal edge opposite from the base portion and configured to define a cutoff pattern along an edge of the portion of light emitted from the light source, wherein the outer surface of the housing defines a flat surface adjacent to the slot and which engages and locates the base portion of the cutoff shield, and wherein the cutoff shield is selected from a set of interchangeable cutoff shields, each having a different shape to define a different cutoff pattern and each sized and configured to extend through the slot.

13. The headlight assembly of claim 12, wherein the cutoff shield is fixed to the outer surface of the housing.

14. The headlight assembly of claim 13, wherein the outer surface of the housing defines a fixation feature adjacent to the slot and which is deformed to secure the cutoff shield thereto.

15. The headlight assembly of claim 13, wherein the outer surface of the housing defines an alignment feature adjacent to the slot and which engages a corresponding structure of the cutoff shield for aligning the cutoff shield at a particular position relative to the lens and the light source.

16. The headlight assembly of claim 12, wherein the cutoff shield is attached to the outer surface of the housing, without any fastener in the interior of the housing for holding the cutoff shield.

17. The headlight assembly of claim 12, wherein the outer surface is non-flat, wherein the cutoff shield includes a shield portion that extends through the slot, and a base portion for securement to the outer surface of the housing, and wherein the base portion defines two or more different sections, with each of the two or more different sections configured engage corresponding parts of the outer surface for securement thereto.

* * * * *